United States Patent
Braemer et al.

(10) Patent No.: US 7,313,618 B2
(45) Date of Patent: Dec. 25, 2007

(54) NETWORK ARCHITECTURE USING FIREWALLS

(75) Inventors: Achim Braemer, Heidelberg (DE); Sachar Paulus, Weinheim (DE)

(73) Assignee: SAP Aktiengesellschaft, Walldorf (DE)

( * ) Notice: Subject to any disclaimer, the term of this patent is extended or adjusted under 35 U.S.C. 154(b) by 736 days.

(21) Appl. No.: 10/286,382

(22) Filed: Oct. 31, 2002

(65) Prior Publication Data

US 2004/0088409 A1 May 6, 2004

(51) Int. Cl.
*G06F 15/173* (2006.01)
(52) U.S. Cl. ............... 709/225; 709/229; 709/227; 709/239
(58) Field of Classification Search ............... 709/203, 709/223, 225, 227, 229, 239
See application file for complete search history.

(56) References Cited

U.S. PATENT DOCUMENTS

| | | | | |
|---|---|---|---|---|
| 6,003,084 | A * | 12/1999 | Green et al. | 709/227 |
| 6,104,716 | A * | 8/2000 | Crichton et al. | 370/401 |
| 6,324,648 | B1 * | 11/2001 | Grantges, Jr. | 726/12 |
| 6,349,336 | B1 * | 2/2002 | Sit et al. | 709/227 |
| 6,374,298 | B2 * | 4/2002 | Tanno | 709/227 |
| 6,381,644 | B2 * | 4/2002 | Munguia et al. | 709/225 |
| 6,505,254 | B1 * | 1/2003 | Johnson et al. | 709/239 |
| 6,598,167 | B2 * | 7/2003 | Devine et al. | 726/8 |
| 6,615,258 | B1 * | 9/2003 | Barry et al. | 709/223 |
| 6,631,417 | B1 * | 10/2003 | Balabine | 709/229 |
| 6,662,228 | B1 * | 12/2003 | Limsico | 709/225 |
| 6,714,979 | B1 * | 3/2004 | Brandt et al. | 709/225 |
| 6,718,388 | B1 * | 4/2004 | Yarborough et al. | 709/227 |
| 6,751,668 | B1 * | 6/2004 | Lin et al. | 709/227 |
| 6,751,677 | B1 * | 6/2004 | Ilnicki et al. | 719/316 |
| 6,754,621 | B1 * | 6/2004 | Cunningham et al. | 704/219 |
| 6,754,831 | B2 * | 6/2004 | Brownell | 726/15 |
| 6,799,177 | B1 * | 9/2004 | Fai et al. | 707/9 |
| 6,941,369 | B1 * | 9/2005 | Krack et al. | 709/225 |
| 6,981,278 | B1 * | 12/2005 | Minnig et al. | 726/12 |
| 6,988,147 | B2 * | 1/2006 | King | 709/239 |
| 7,093,121 | B2 * | 8/2006 | Barton et al. | 713/150 |
| 7,161,947 | B1 * | 1/2007 | Desai | 370/401 |
| 7,215,777 | B2 * | 5/2007 | Deen et al. | 380/270 |
| 2002/0023143 | A1 * | 2/2002 | Stephenson et al. | 709/218 |

FOREIGN PATENT DOCUMENTS

| | | | |
|---|---|---|---|
| WO | WO 01/33801 A2 | 5/2001 | |
| WO | WO 01/33801 A3 | 5/2001 | |

OTHER PUBLICATIONS

Microsoft Computer Dictionary (fifth edition) p. 214-215, no date.*

(Continued)

*Primary Examiner*—Saleh Najjar
*Assistant Examiner*—Faruk Hamza
(74) *Attorney, Agent, or Firm*—Fish & Richardson P.C.

(57) ABSTRACT

Systems, methods, and apparatus, including computer program products, for securing access to a server computer that is operable to process client requests from a client computer. A firewall is located between a dispatcher and the server computer. The firewall prevents requests from the dispatcher's side of the firewall from crossing through the firewall. The dispatcher is operable to establish a static connection with the server computer through the firewall, to receive a client request transmitted from the client computer, and to transmit the client request to the server computer through the static connection.

36 Claims, 2 Drawing Sheets

OTHER PUBLICATIONS

Fort Noxx Security Server, Technical Specification, iBRiXX, Copyright 1999, 2000, 2001 by iBRiXX AG, Basic principle: The AFZ architecture, pp. 1-4.
SearchSecurity.com Definitions, firewall, Aug. 26, 2002, Internet page.
Fort Noxx, The Security Server, The business and the world out there, The special solution: The Internet Security Server for safe transactions, Facing the challenge with an innovative solution, Fort Noxx, The Internet Security Server, iBRiXX, 6 pages, no date.

* cited by examiner

NETWORK ARCHITECTURE USING FIREWALLS

BACKGROUND

The present application relates to computer networks, and more particularly to network architectures with firewalls.

Network connectivity offers numerous advantages. However, security may be a major concern when connecting a computer to a network such as the Internet. There are significant security risks associated with computer networks, and these risks may not be obvious to either new or existing users. One particular risk is unauthorized access and activity, including theft and destruction of data and intellectual property. Intruder activity can be difficult to discover and to remedy. Many organizations have lost productive time and money in dealing with intruder activity, and the reputations of some organizations have suffered as a result of negative publicity created by intruder activity at their sites.

Installation of a firewall is one technique that has proven effective in improving the security of a private network or site. A firewall is a system of related programs, usually installed on a network gateway server, that protects the data and resources of a private network from users outside the network. A firewall may also be installed on one or more lower-level gateways so as to provide protection for a specific set or subset of a private network. Firewalls are often installed on specially designated computers that are separate from the private network so that no incoming request can access the resources of the private network directly.

The main purpose of a firewall is to protect the applications, services, data, and other resources located on a private network by securing access to those resources. A firewall may also be used to control which outside resources the users of a private network may access.

Firewalls can be implemented using various conventional screening methods. One common technique that is used is to allow requests to proceed only if they come from acceptable, previously-identified domain names or Internet Protocol (IP) addresses. Firewalls can also be implemented at the application level rather than the network level. An application level firewall examines requests at a higher level than the network level. For example, an application level firewall may examine application requests such as Hypertext Transfer Protocol (HTTP) requests, Structured Query Language (SQL) requests, or Simple Object Access Protocol (SOAP) requests, rather than the network addresses of the requests. An application level firewall can be configured, for example, to screen out all requests other than those sent to known applications or programs running on a server. The server's port mechanism can be used to implement such a firewall. Firewalls may also allow remote access to private networks through the use of secure logon procedures or authentication credentials (e.g., digital certificates, one-time passwords, or security tokens).

Firewalls can be used to implement and enforce an organization's network access policy by forcing all network connections to pass through a firewall gateway, where the connections can be examined and evaluated. Firewalls can also control or restrict access to or from selected systems, block certain services, and provide additional security functionality, such as the replacement of simple password mechanisms with advanced authentication measures. Firewalls may also provide other advantages by concentrating security, protecting vulnerable services, enhancing privacy, maintaining logs and statistics on network use, and enforcing a network misuse policy.

Without a firewall, an intranet or private network may be exposed to probes and attacks from external sources. In an environment without a firewall, network security may rely on the security of individual host computers, which must cooperate in a way to achieve a uniformly high level of security. This can become a significant issue as the size of the private network increases: the larger the network, the less manageable it is to maintain the same level of security for all the hosts on the network. As mistakes and lapses in security arise, break-ins may occur. Such break-ins may not be the result of complex attacks, but may be caused by simple errors in configuration and inadequate password protection.

SUMMARY

The present invention provides methods and systems, including computer program products, that can be used to secure access to resources in a private zone or network. The private zone or network may contain one or more computer servers that execute applications or provide services to external clients. The private zone or network may also contain additional resources that can be accessed by clients located outside the private zone or network. The present invention may use existing or modified firewall architectures to secure access to and to protect the resources of a private zone or network.

In one aspect, the invention features a system for securing access to a server computer. The server computer is operable to process client requests from a client computer. The system includes a dispatcher, and a firewall located between the dispatcher and the server computer. The firewall prevents requests from the dispatcher's side of the firewall from crossing through the firewall. The dispatcher is operable to establish a static connection with the server computer through the firewall, to receive a client request transmitted from the client computer, and to transmit the client request to the server computer through the static connection. In one implementation, the dispatcher is operable to directly transmit the client request to the server computer.

In another aspect, the invention features a system for securing access to a server computer. The server computer is operable to process client requests from a client computer. The system includes a dispatcher, a first firewall located between the client computer and the dispatcher, and a second firewall located between the dispatcher and the server computer. The second firewall prevents requests from the dispatcher's side of the second firewall from crossing through the second firewall. The dispatcher is operable to establish a static connection with the server computer through the second firewall, to receive a client request transmitted from the client computer through the first firewall, and to transmit the client request to the server computer through the static connection.

Advantageous implementations can include one or more of the following features. The server computer may be operable to transmit to the dispatcher a request to establish the static connection through the second firewall, and the dispatcher may be operable to establish the static connection upon receipt of the server request. The first firewall may prevent requests from the dispatcher's side of the first firewall from crossing through the first firewall.

The dispatcher may be further operable to directly transmit the client request to the server computer, or to transmit the client request to the server computer in real time. The dispatcher may also be operable to encrypt data transmitted over the static connection, and to provide security services pertaining to the client request. Security services can include verifying that the client request is authorized, verifying the authenticity of the client request, and scanning the client request for virus infections.

In another aspect, the invention features methods and apparatus, including computer program products, that establish a static connection between a dispatcher and a server computer through a firewall located between the dispatcher and the server computer. The firewall prevents requests from the dispatcher's side of the firewall from passing through the firewall. A client request, which is transmitted from a client computer, is received at the dispatcher. The client request is transmitted from the dispatcher to the server computer through the static connection. In one implementation, the client request is directly transmitted from the dispatcher to the server computer.

In yet another aspect, the invention features methods and apparatus, including computer program products, that establish a static connection between a dispatcher and a server computer through a second firewall located between the dispatcher and the server computer. The second firewall prevents requests from the dispatcher's side of the second firewall from passing through the second firewall. A client request, which is transmitted from a client computer through a first firewall located between the client computer and the dispatcher, is received at the dispatcher. The client request is transmitted from the dispatcher to the server computer through the static connection.

Advantageous implementations can include one or more of the following features. Security services pertaining to the client request can be performed before transmitting the client request from the dispatcher to the server computer. The client request can be directly transmitted from the dispatcher to the server computer. The client request can be transmitted to the server computer in real time. Transmission of the client request to the server computer can occur directly after, substantially immediately after, or within a specified period of time after receipt of the client request at the dispatcher. The server computer can transmit a request to the dispatcher to establish the static connection through the second firewall. The first firewall can prevent requests from the dispatcher's side of the first firewall from crossing through the first firewall. A response to the client request can be transmitted from the server computer to the dispatcher through the static connection, and the response can be transmitted from the dispatcher to the client computer through the first firewall.

The invention can be implemented to realize one or more of the following advantages. The invention can be used to provide secure access to applications, services, and other resources over the Internet, or internally within a company. The invention can be used to protect applications, services, and other resources from network intrusions. The invention can be used to provide secure access in a highly scalable way that accommodates numerous clients and resources. The invention can be used to provide secure access to protected applications, services, or resources with high performance. The invention can be used to transfer client requests in real time. One implementation of the invention provides all of the above advantages.

The details of one or more implementations of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
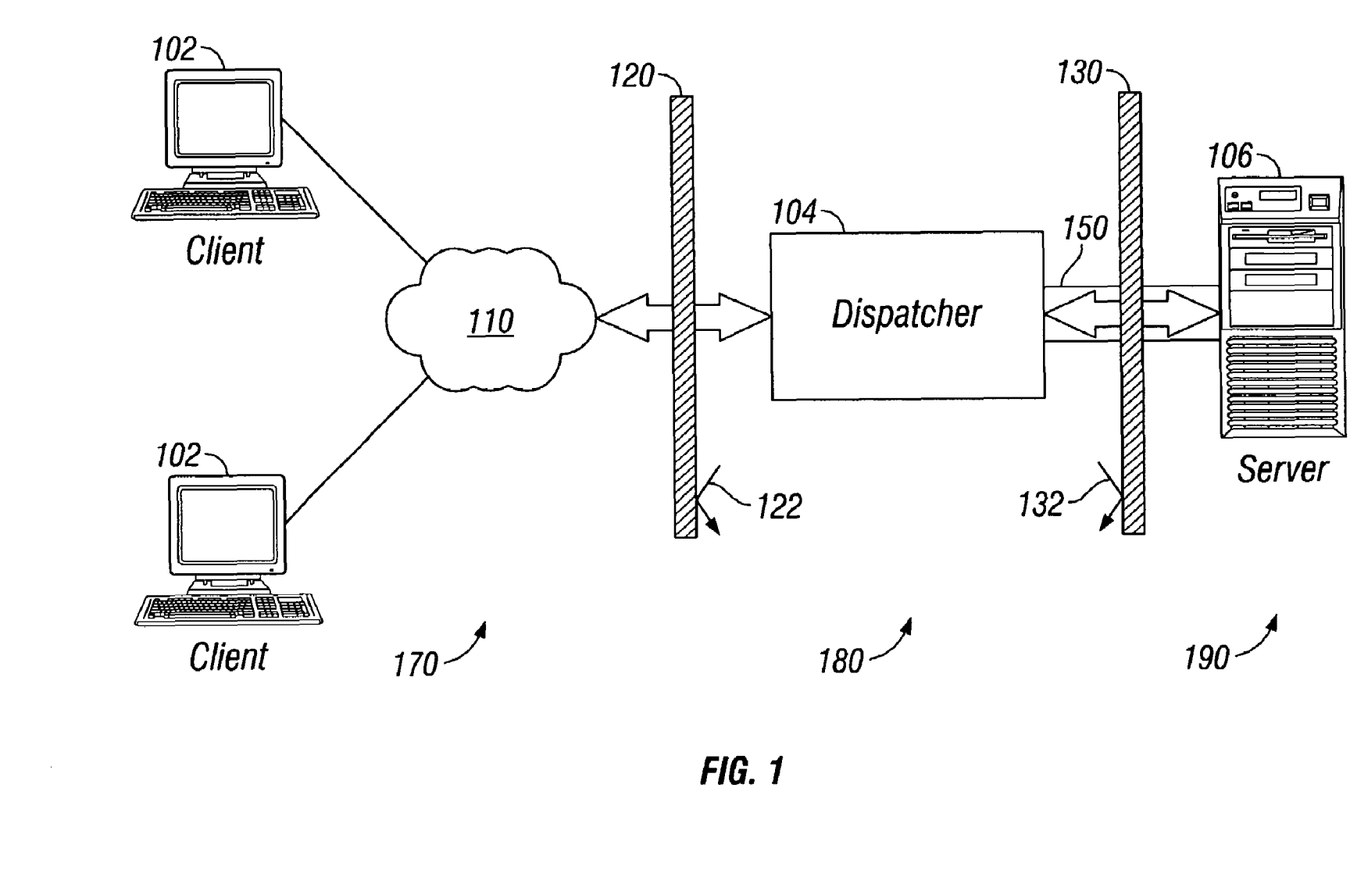
FIG. 1 is a block diagram of a system in accordance with one embodiment of the invention.

As shown in FIG. 1, a system in accordance with one aspect of the invention includes two firewalls 120, 130 that create an external zone 170, a middle zone 180, and a private zone 190. The external zone 170 contains one or more client computers 102 that initiate and send requests to a server 106. The requests can be any general application level requests, such as HTTP requests, SQL requests, SOAP requests, Remote Procedure Call (RPC) requests, Hypertext Transfer Protocol, Secure (HTTPS) requests, or any other requests that implement an application level protocol. The private zone 190 contains server 106, which may be an application server or a data server designed to provide services or data to a client computer. Client computer 102 and server 106 are generally remote from each other, and typically interact through a communication network 110, which may include the Internet. The relationship of client computer 102 and server 106 may arise by virtue of computer programs running on the respective computers and having a client-server relationship to each other.

The system shown in FIG. 1 can generally be applied in any scenario involving client-server access (including both web-based and non-web-based scenarios) where it is desirable to segregate the server for security reasons. The system can include multiple client computers 102, as well as multiple servers 106. The private zone 190 can also contain additional networked resources, which can be connected to a dispatcher 104 either directly or through server 106. The components shown in FIG. 1 can generally be interconnected by any form or medium capable of data communication, such as a communication network. Examples of communication networks include a local area network (LAN), a wide-area network (WAN), and the Internet.

Client computer 102 can be any device, such as a desktop computer, a laptop computer, a personal digital assistant (PDA), or a wireless phone that can access the communication network 110. Client computer 102 can also be a server, as in the situation where one server needs to access data or services on a second server. Client computer 102 can have any kind of user interface, including a graphical user interface or a web browser, that allows users to interact with any combination of components in the external zone 170, the middle zone 180, and the private zone 190.

As explained above, server 106 can be any computer designed to respond to requests generated by a client computer 102. Server 106 can be a Java server—e.g., a Java 2 Platform, Enterprise Edition (J2 EE) server, or a Java 2 Platform, Standard Edition (J2 SE) server—designed to handle Java requests. Server 106 can also be a web application server.

Dispatcher 104 can be a server that is specifically configured to perform the functions described in this specification. In its most basic form, dispatcher 104 is a component that simply transmits client requests through firewall 130 to server 106, and responses from server 106 back to client computer 102. However, dispatcher 104 can be configured to perform additional functions, such as load balancing, scanning for viruses, and encrypting communication. In an alternative implementation, dispatcher 104 can also be configured to act as an application proxy by serving as a termination point for a client-server connection, performing optional security functions such as content screening on messages received through the client-server connection, and establishing a separate connection to send the messages to and to receive replies from the actual application.

The two firewalls 120, 130 separate the external zone 170 from the private zone 190. For increased security, firewall 130 should be semi-permeable, meaning that it prevents requests from the external zone 170 or the middle zone 180 from crossing into or accessing the private zone 190, as shown conceptually by bent arrow 132. Data and requests (and responses to requests) can still flow through firewall 130 in the manner described below, but the semi-permeable nature of firewall 130 is significant: By not allowing external requests to pass through the firewall into private zone 190, firewall 130 prevents intruders from accessing server 106 and other resources in private zone 190, whether such access is sought from an external client 102 or from dispatcher 104. Requests from private zone 190, such as RFC, HTTP, or other requests, may, however, pass through firewall 130.

Firewall 120 may also be semi-permeable, meaning that it blocks requests from the private zone 190 or the middle zone 180 from crossing into or accessing the external zone 170, as shown conceptually by bent arrow 122. Requests from external zone 170, such as HTTPS requests, may however, pass through firewall 120. A semi-permeable firewall 120 can be used to help prevent confidential information from being transmitted to external zone 170. If an intruder breaks into a system in the middle zone 180 or in the private zone 190, he may be able to install a program that intercepts communications or otherwise discovers confidential information and transmits such information to an external computer. If firewall 120 is semi-permeable, however, the hostile program can only transmit such information through an open connection that has been established by a specific computer in external zone 170. Intrusion detection software can be used to detect and minimize the risk of such a breach. In other implementations, firewall 120 need not be semi-permeable, and indeed, firewall 120 can be omitted altogether, although such an implementation would leave the components in the middle zone 180 vulnerable to attack.

In order to set up an open path through which dispatcher 104 can send client requests to, receive responses from, and generally communicate with server 106, dispatcher 104 establishes a static connection 150 with server 106. A static connection is a stateful connection about which information is retained for future use so that there is no need to establish a new connection every time new information or new requests need to be transmitted. A static connection, which can be maintained at the network level, may be kept open even though the components it connects might not be transmitting information. Telnet and the file transfer protocol (FTP) are examples of two well-known application level protocols in which static connections are created between computers.

The stateful nature of static connection 150 enables firewall 130 to be aware of the connection and to associate new packets or data being sent through the connection with the existing connection rather than with a new connection. Firewall 130 may generally be able to monitor multiple connections and may apply controls or restrictions related to the connections (e.g., restrictions on the permissible number, sources, or destinations of connections). The network level information monitored by firewall 130, such as Transmission Control Protocol/Internet Protocol (TCP/IP) packet headers, can be used by firewall 130 to determine whether a particular packet or segment of data is associated with an existing connection such as static connection 150. If a packet or data segment is associated with static connection 150, firewall 130 can allow the packet or data segment to proceed through the connection to its destination.

When there is no data being sent through static connection 150, network packets may be sent in order to maintain the connection. Network connections are typically implemented using buffers, and in some implementations, if a component on one end of a connection notices that a buffer associated with the connection has been empty for more than a predetermined period of time (e.g., for more than one minute), the component may assume that the connection has been lost and may therefore close the connection. In such an implementation, dispatcher 104 and server 106 can send network packets through static connection 150 in order to indicate that the connection is alive and should not be timed out.

Because of the semi-permeable nature of firewall 130, which is recommended for enhanced security, dispatcher 104 cannot initiate the request to open static connection 150—rather, server 106 must initiate and send a request to dispatcher 104 to establish static connection 150. Server 106 can send such a request, for example, when the server first boots up. Alternatively, server 106 can send such a request after confirmation that firewall 130 is operational, upon the launch of a specific application, or when the server is ready to receive client requests. Dispatcher 104 establishes a static connection 150 with server 106 upon receipt of such a request. For additional security, static connection 150 may be established using mutual authentication, e.g., by using a secure sockets layer (SSL) protocol with client authentication, or other appropriate means.

After static connection 150 has been established, dispatcher 104 can transmit requests from client computer 102 to server 106 directly, without holding up or otherwise delaying the requests. Static connection 150 acts as a tunnel through firewall 130 that allows dispatcher 104 to transmit requests from client computer 102 as soon as dispatcher 104 receives such requests. That is, dispatcher 104 can use static connection 150 to transmit client requests to server 106 substantially immediately after receiving such requests. In one implementation, dispatcher 104 can transmit requests from client computer 102 to server 106 within a specified period of time after dispatcher 104 receives such requests, or shortly thereafter. If the specified period of time is short (e.g., on the order of a few seconds or less), the transmission of client requests from dispatcher 104 may be considered to occur in real time. Static connection 150 thus increases throughput and performance, especially in contrast to conventional systems, which may, for example, queue client requests in the middle zone and wait for a server in the private zone to send a request to transmit the queued client requests to the server.

Although dispatcher 104 may simply forward client requests to server 106, dispatcher 104 may alternatively perform additional services or functions before transmitting client requests to server 106. For example, dispatcher 104 may translate destination addresses in client requests (such as the IP address of server 106) from addresses known and used in external zone 170 into corresponding addresses known and used only in private zone 190. Dispatcher 104 may also change destination addresses so as to re-route client requests to servers with low loads, as explained below.

Dispatcher 104 can also be programmed to perform security services pertaining to the client requests, such as verifying the authenticity of the client requests, verifying that the client requests are authorized, and scanning the client requests for computer viruses. Dispatcher 104 may screen the content of incoming client requests, and may work in conjunction with additional components in order to perform such security services. For example, dispatcher 104 can examine a client request to determine the identity of the client issuing the request, and can forward the identity of the client, as well as authentication credentials sent by the client, to an authentication authority, which can use the authentication credentials to confirm whether the client is who it purports to be.

There are many different protocols for performing such services or functions. The protocols can include variations in the components (e.g., simple databases or more complex components such as authentication authorities), the location of those components (e.g., in the middle zone 180, in the private zone 190, or in another private zone separated by a different firewall), and the communication with the components (e.g., sending the data itself or sending pointers to the data). In alternative implementations, such additional services or functions may be performed in conjunction firewall 120, firewall 130, or another firewall, or in conjunction with server 106 or another server.

Dispatcher 104 can use known methods to encrypt client requests and other data before sending such data to server 106. By effectively encrypting static connection 150, intruders or other programs can be prevented from intercepting the requests, responses, and other data sent through the connection.

Dispatcher 104 can be implemented to maintain static connections with multiple servers or resources in the private zone. If the resources in the private zone are located behind one firewall, the static connections are built through that firewall. Alternatively, the resources in the private zone may be segregated into separate sub-zones, each located behind a separate firewall, in which case the static connections may be built through multiple firewalls.

In an implementation with multiple servers, dispatcher 104 can be configured to transmit client requests selectively to the servers. For example, dispatcher 104 can transmit client requests to servers that have a low load, thereby helping to balance the overall load and thus increase the performance and the scalability of the system. Alternatively, dispatcher 104 can transmit all client requests to server 106, and server 106 can then distribute or re-route the requests among servers in the private zone 190. In yet another alternative, multiple dispatchers 104 can be set up in the middle zone 180 to help balance the system load and increase the scalability of the system.

Server 106 can close static connection 150 if it detects a security breach, such as transmission of an unauthorized request from dispatcher 104. Static connection 150 can also be closed if either firewall 130 or server 106 malfunction or stop operating. Although it may generally be possible for either dispatcher 104 or server 106 to close static connection 150, in one implementation, only server 106 can close static connection 150. Such an implementation can be used to prevent an intruder who has broken into dispatcher 104 from initiating a denial-of-service attack by shutting down static connection 150.

Figure 2:
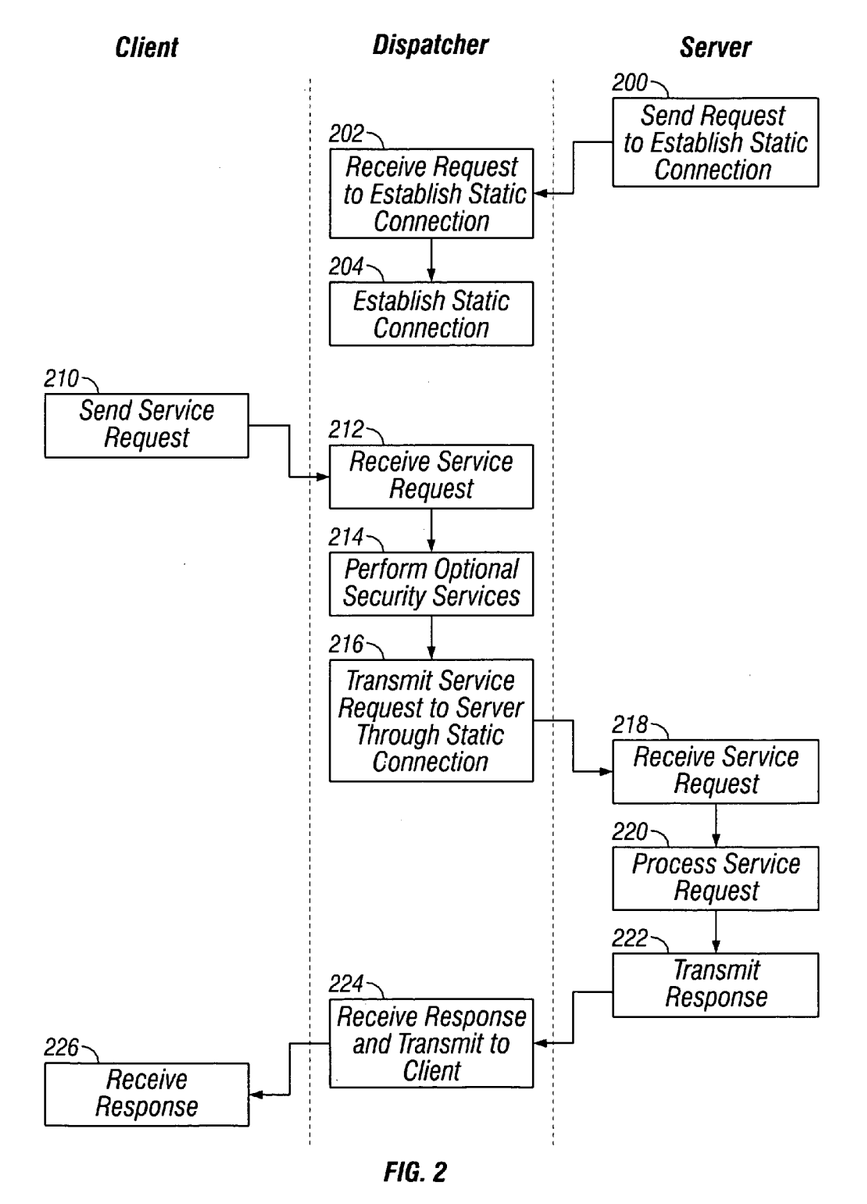
FIG. 2 is a flowchart of a method of using the system of FIG. 1.

FIG. 2 illustrates a method of using the system of FIG. 1. A server 106 first transmits a request to dispatcher 104 to establish a static connection with the server 106 (step 200). Such a request can be transmitted, for example, when the setup of server 106 is complete or nearly complete and the server becomes ready to receive client requests. The request can also be transmitted automatically when server 106 reboots, or when a previously established connection with dispatcher 104 is lost. Dispatcher 104 receives the request to establish a static connection from server 106 (step 202), in response to which dispatcher 104 establishes a static connection with server 106 through firewall 130 (step 204).

Strong mutual authentication can be used to ensure that the static connection is really being established between dispatcher 104 and server 106. This can be accomplished, for example, by using the SSL protocol with client authentication, or other similar mutual authentication mechanisms, to transmit the request to establish the static connection and the response thereto. In such a way, dispatcher 104 can ensure that the request to establish the static connection comes from server 106, and server 106 can ensure that the response to its request comes from dispatcher 104. Server 106 can raise an alert if it notices unusual or irregular responses or behavior in its attempt to establish a connection with dispatcher 104—e.g., if the connection keeps getting dropped.

After a static connection has been established, server 106 and dispatcher 104 may exchange administrative information or execute commands remotely. For example, dispatcher 104 may request information about the load on server 106 for purposes of determining how to route client requests appropriately. As another example, server 106 may execute remote commands on dispatcher 104 (e.g., to monitor the performance of dispatcher 104 or to perform administrative tasks such as allocating or freeing system resources).

At some later time, client computer 102 sends a client request to dispatcher 104 (step 210). Firewall 120 can optionally block the request if the request does not come from an acceptable, previously-identified address. If firewall 120 does not block the request, dispatcher 104 receives the request (step 212). Dispatcher 104 can then perform optional security services (step 214). Optional services, which can be implemented through plug-in modules, may be used, for example, to scan the client request for viruses, to authenticate the client making the request, or to check that the client request is authorized. Such optional services can alternatively be performed by server 106 rather than dispatcher 104.

Dispatcher 104 transmits the client request through the static connection 150 to server 106 (step 216). Server 106 receives the request (step 218), processes the request (step 220), and transmits a response back to dispatcher 104 through static connection 150 (step 222). Upon receipt of the response (step 224), dispatcher 104 transmits the response to client computer 102. The process terminates when client computer 102 receives the response (step 226). Client computer 102 (or a different client) may then generate a new request. Dispatcher 104 can maintain static connection 150 open so that it can continue to transmit client requests directly to server 106.

Although the present invention can be used to secure access to resources in a private zone, security breaches may still occur. For example, an intruder could attack and gain control of dispatcher 104. To minimize the risk associated with such a breach, additional enhancements can be made to the system described herein. Application level checks can be made to verify the validity and authenticity of client requests. For example, the system can be implemented to require the use of digitally signed requests, such as those detailed in the Organization for the Advancement of Structured Information Standards (OASIS) Web Services Security (WS-Security) specification. Such application level checks can be made either at dispatcher 104 or server 106.

An intruder could also install a "silent listener" program that captures confidential information and transmits such information to the external zone 170. As explained above, the risk of such a breach can be minimized by making firewall 120 semi-permeable, and by using intrusion detection software to detect the capture and transmission of such information through open connections in firewall 120.

Another type of attack that may occur is an "end-to-end" attack, in which a client submits a malicious request at the application level. To counter such a threat, additional authorization checks can be performed, either by an application executing on server 106 (or elsewhere in private zone 190) or by a front end to the application. For example, assertions about the capabilities or permissions of a requester may be required to be attached to requests, and such assertions may be required to be signed by a trusted authority. The signature accompanying a request can then be verified, as can the capabilities of the requester, before the request is processed.

The invention described herein can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method acts of the invention can be performed by one or more programmable processors executing a computer program to perform functions of the invention by operating on input data and generating output. Method acts can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention herein has been described in terms of particular embodiments. Other embodiments are within the scope of the following claims. For example, the steps of the invention can be performed in a different order and still achieve desirable results.

What is claimed is:

1. A system for securing access to a server computer, wherein the server computer is operable to process client requests from a client computer, the system comprising:
   a dispatcher; and
   a firewall having a dispatcher side and a server side that is distinct from the dispatcher side, the dispatcher being located on the dispatcher side of the firewall, the server computer being located on the server side of the firewall, wherein the firewall prevents any connections from being initiated from the dispatcher side of the firewall through the firewall to any computer on the server side of the firewall;
   wherein the dispatcher is operable to establish a static connection with the server computer through the firewall in response to a request initiated from the server side of the firewall, wherein the dispatcher is further operable to receive a client request from the client computer and to transmit the client request to the server computer through the static connection, and wherein the firewall prevents any requests from the dispatcher side of the firewall from crossing through the firewall except through a static connection established in response to a request initiated from the server side of the firewall.

2. The system of claim 1 wherein the dispatcher is operable to directly transmit the client request to the server computer.

3. A system for securing access to a server computer, wherein the server computer is operable to process client requests from a client computer, the system comprising:
   a dispatcher;
   a first firewall between the client computer and the dispatcher; and
   a second firewall having a dispatcher side and a server side that is distinct from the dispatcher side, the dispatcher being located on the dispatcher side of the second firewall, the server computer being located on the server side of the second firewall, wherein the second firewall prevents any connections from being initiated from the dispatcher side of the second firewall through the second firewall to any computer on the server side of the firewall;
   wherein the dispatcher is operable to establish a static connection with the server computer through the second firewall in response to a request initiated from the server side of the second firewall, wherein the dispatcher is further operable to receive a client request transmitted from the client computer through the first firewall and to transmit the client request to the server computer through the static connection, and wherein the second firewall prevents any requests from the dispatcher side of the second firewall from crossing through the second firewall except through a static connection established in response to a request initiated from the server side of the second firewall.

4. The system of claim 3 wherein the server computer is further operable to transmit to the dispatcher a request to establish the static connection through the second firewall, and wherein the dispatcher is operable to establish the static connection upon receipt of the server request.

5. The system of claim 3 wherein the dispatcher is operable to directly transmit the client request to the server computer.

6. The system of claim 3 wherein the dispatcher is operable to transmit the client request to the server computer in real time.

7. The system of claim 3, further comprising a plurality of server computers located on the server side of the second firewall, wherein the dispatcher is further operable to establish a plurality of static connections through the second firewall, each being between the dispatcher and one of the plurality of server computers.

8. The system of claim 7 wherein the dispatcher is further operable to balance a load of client requests by selectively transmitting each of the client requests to an individual one of the plurality of server computers.

9. The system of claim 3 wherein the dispatcher is further operable to encrypt data transmitted over the static connection.

10. The system of claim 3 wherein the dispatcher is further operable to provide security services pertaining to the client request.

11. The system of claim 10 wherein the security services comprise verifying that the client request is authorized.

12. The system of claim 10 wherein the security services comprise verifying the authenticity of the client request.

13. The system of claim 10 wherein the security services comprise scanning the client request for virus infections.

14. The system of claim 3 wherein the first firewall prevents requests from the dispatcher's side of the first firewall from crossing through the first firewall.

15. A method comprising:
   establishing a static connection between a dispatcher and a server computer through a firewall having a dispatcher side and a server side that is distinct from the dispatcher side, the dispatcher being located on the dispatcher side of the firewall, the server computer being located on the server side of the firewall, the static connection being established in response to a request initiated from the server side of the firewall, wherein the firewall prevents any connections from being initiated from the dispatcher side of the firewall through the firewall to any computer on the server side of the firewall, and wherein the firewall prevents any requests from the dispatcher side of the firewall from crossing through the firewall except through a static connection established in response to a request initiated from the server side of the firewall;
   receiving a client request from a client computer at the dispatcher; and
   transmitting the client request from the dispatcher to the server computer through the static connection.

16. The method of claim 15 wherein the client request is directly transmitted from the dispatcher to the server computer.

17. A method comprising:
   establishing a static connection between a dispatcher and a server computer through a second firewall having a dispatcher side and a server side that is distinct from the dispatcher side, the dispatcher being located on the dispatcher side of the second firewall, the server computer being located on the server side of the second firewall, the static connection being established in response to a request initiated from the server side of the second firewall, wherein the second firewall prevents any connections from being initiated from the dispatcher side of the second firewall through the second firewall to any computer on the server side of the second firewall, and wherein the second firewall prevents any requests from the dispatcher side of the second firewall from crossing through the second firewall except through a static connection established in response to a request initiated from the server side of the second firewall;
   receiving a client request at the dispatcher, wherein the client request is transmitted from a client computer through a first firewall located between the client computer and the dispatcher; and
   transmitting the client request from the dispatcher to the server computer through the static connection.

18. The method of claim 17 wherein the client request is directly transmitted from the dispatcher to the server computer.

19. The method of claim 17 wherein the client request is transmitted from the dispatcher to the server computer in real time.

20. The method of claim 17 wherein the step of transmitting the client request occurs directly after the step of receiving the client request.

21. The method of claim 17 wherein the step of transmitting the client request occurs within a specified period of time after the step of receiving the client request.

22. The method of claim 17 further comprising performing security services pertaining to the client request before transmitting the client request from the dispatcher to the server computer.

23. The method of claim 17 further comprising transmitting a request from the server computer to the dispatcher to establish the static connection through the second firewall.

24. The method of claim 17 wherein the first firewall prevents requests from the dispatcher's side of the first firewall from crossing through the first firewall.

25. The method of claim 17 further comprising:
   transmitting a response to the client request from the server computer to the dispatcher through the static connection; and
   transmitting the response from the dispatcher to the client computer through the first firewall.

26. A computer program product, stored on a machine-readable medium, comprising instructions operable to cause a programmable processor to:
   establish a static connection between a dispatcher and a server computer through a firewall having a dispatcher side and a server side that is distinct from the dispatcher side, the dispatcher being located on the dispatcher side of the firewall, the server computer being located on the server side of the firewall, the static connection being established in response to a request initiated from the server side of the firewall, wherein the firewall prevents any connections from being initiated from the dispatcher side of the firewall through the firewall to any computer on the server side of the firewall, and wherein the firewall prevents any requests from the dispatcher side of the firewall from crossing through the firewall except through a static connection established in response to a request initiated from the server side of the firewall;
   receive a client request from a client computer at the dispatcher; and
   transmit the client request from the dispatcher to the server computer through the static connection.

27. A computer program product, stored on a machine-readable medium, comprising instructions operable to cause a programmable processor to:

establish a static connection between a dispatcher and a server computer through a firewall having a dispatcher side and a server side that is distinct from the dispatcher side, the dispatcher being located on the dispatcher side of the firewall, the server computer being located on the server side of the firewall, the static connection being established in response to a request initiated from the server side of the firewall, wherein the firewall prevents any connections from being initiated from the dispatcher side of the firewall through the firewall to any computer on the server side of the firewall, and wherein the firewall prevents any requests from the dispatcher side of the firewall from crossing through the firewall except through a static connection established in response to a request initiated from the server side of the firewall;

receive a client request from a client computer at the dispatcher; and directly transmit the client request from the dispatcher to the server computer through the static connection.

28. A computer program product, stored on a machine-readable medium, comprising instructions operable to cause a programmable processor to:

establish a static connection between a dispatcher and a server computer through a second firewall having a dispatcher side and a server side that is distinct from the dispatcher side, the dispatcher being located on the dispatcher side of the second firewall, the server computer being located on the server side of the second firewall, the static connection being established in response to a request initiated from the server side of the second firewall, wherein the second firewall prevents any connections from being initiated from the dispatcher side of the second firewall through the second firewall to any computer on the server side of the second firewall, and wherein the second firewall prevents any requests from the dispatcher side of the second firewall from crossing through the second firewall except through a static connection established in response to a request initiated from the server side of the second firewall;

receive a client request at the dispatcher, wherein the client request is transmitted from a client computer through a first firewall located between the client computer and the dispatcher; and transmit the client request from the dispatcher to the server computer through the static connection.

29. The computer program product of claim 28 wherein the first firewall prevents requests from the dispatcher's side of the first firewall from crossing through the first firewall.

30. A computer program product, stored on a machine-readable medium, comprising instructions operable to cause a programmable processor to:

establish a static connection between a dispatcher and a server computer through a second firewall having a dispatcher side and a server side that is distinct from the dispatcher side, the dispatcher being located on the dispatcher side of the second firewall, the server computer being located on the server side of the second firewall, the static connection being established in response to a request initiated from the server side of the second firewall, wherein the second firewall prevents any connections from being initiated from the dispatcher side of the second firewall through the second firewall to any computer on the server side of the second firewall, and wherein the second firewall prevents any requests from the dispatcher side of the second firewall from crossing through the second firewall except through a static connection established in response to a request initiated from the server side of the second firewall;

receive a client request at the dispatcher, wherein the client request is transmitted from a client computer through a first firewall located between the client computer and the dispatcher; and directly transmit the client request from the dispatcher to the server computer through the static connection.

31. A computer program product, stored on a machine-readable medium, comprising instructions operable to cause a programmable processor to:

establish a static connection between a dispatcher and a server computer through a second firewall having a dispatcher side and a server side that is distinct from the dispatcher side, the dispatcher being located on the dispatcher side of the second firewall, the server computer being located on the server side of the second firewall, the static connection being established in response to a request initiated from the server side of the second firewall, wherein the second firewall prevents any connections from being initiated from the dispatcher side of the second firewall through the second firewall to any computer on the server side of the second firewall, and wherein the second firewall prevents any requests from the dispatcher side of the second firewall from crossing through the second firewall except through a static connection established in response to a request initiated from the server side of the second firewall;

receive a client request at the dispatcher, wherein the client request is transmitted from a client computer through a first firewall located between the client computer and the dispatcher; and after receipt of the client request, transmit the client request from the dispatcher to the server computer through the static connection.

32. A computer program product, stored on a machine-readable medium, comprising instructions operable to cause a programmable processor to:

establish a static connection between a dispatcher and a server computer through a second firewall having a dispatcher side and a server side that is distinct from the dispatcher side, the dispatcher being located on the dispatcher side of the second firewall, the server computer being located on the server side of the second firewall, the static connection being established in response to a request initiated from the server side of the second firewall, wherein the second firewall prevents any connections from being initiated from the dispatcher side of the second firewall through the second firewall to any computer on the server side of the second firewall, and wherein the second firewall prevents any requests from the dispatcher side of the second firewall from crossing through the second firewall except through a static connection established in response to a request initiated from the server side of the second firewall;

receive a client request at the dispatcher, wherein the client request is transmitted from a client computer through a first firewall located between the client computer and the dispatcher; and within a specified period of time after receipt of the client request, transmit the client request from the dispatcher to the server computer through the static connection.

33. A computer program product, stored on a machine-readable medium, comprising instructions operable to cause a programmable processor to:

establish a static connection between a dispatcher and a server computer through a second firewall having a dispatcher side and a server side that is distinct from the dispatcher side, the dispatcher being located on the dispatcher side of the second firewall, the server computer being located on the server side of the second firewall, the static connection being established in response to a request initiated from the server side of the second firewall, wherein the second firewall prevents any connections from being initiated from the dispatcher side of the second firewall through the second firewall to any computer on the server side of the second firewall, and wherein the second firewall prevents any requests from the dispatcher side of the second firewall from crossing through the second firewall except though a static connection established in response to a request initiated from the server side of the second firewall;

receive a client request at the dispatcher, wherein the client request is transmitted from a client computer through a first firewall located between the client computer and the dispatcher;

perform security services pertaining to the client request; and transmit the client request from the dispatcher to the server computer though the static connection.

34. The computer program product of claim 28, wherein the instructions are further operable to cause the programmable processor to:

transmit a response to the client request from the server computer to the dispatcher through the static connection; and transmit the response from the dispatcher to the client computer though the first firewall.

35. The computer program product of claim 28, wherein the instructions are operable to cause the programmable processor to transmit the client request from the dispatcher to the server computer in real time.

36. The computer program product of claim 28, wherein the instructions are further operable to cause the programmable processor to transmit a request from the server computer to the dispatcher to establish the static connection through the second firewall.

* * * * *